Dec. 5, 1933.  H. L. FLATHER  1,937,948
WORK ROTATING STRUCTURE FOR MACHINE TOOLS
Filed March 17, 1931
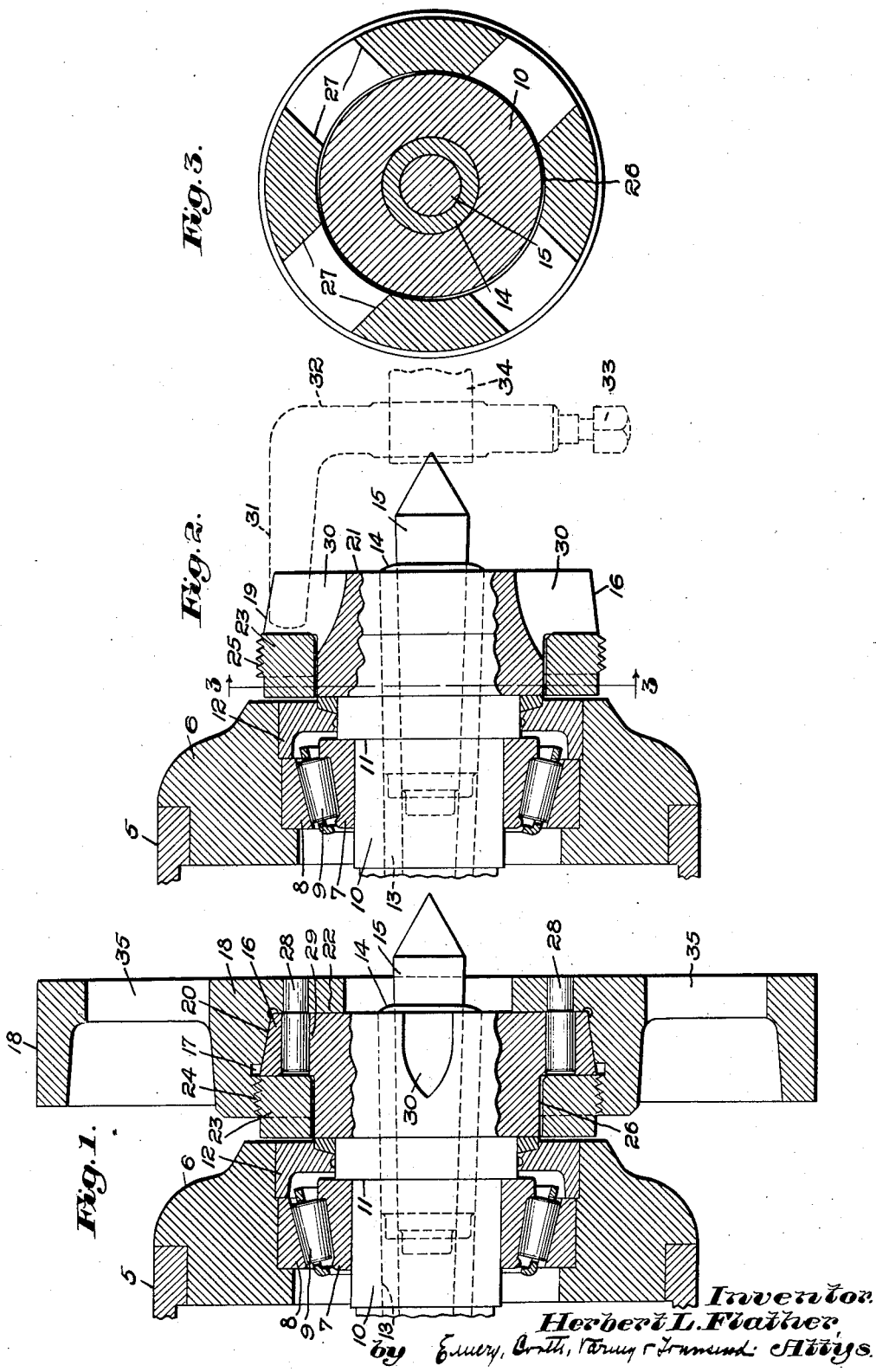
Inventor
Herbert L. Flather
by Emery, Booth, Varney & Townsend Attys.

Patented Dec. 5, 1933

1,937,948

UNITED STATES PATENT OFFICE 1,937,948

WORK-ROTATING STRUCTURE FOR MACHINE TOOLS

Herbert L. Flather, Nashua, N. H.; Joseph H. Flather and Herbert H. Flather, administrators of said Herbert L. Flather, deceased Application March 17, 1931. Serial No. 523,292

17 Claims. (Cl. 82—30)

This invention relates to mountings for face-plates, chucks, fixtures and similar parts on spindles of lathes and other machine tools. The conventional mounting comprises a screw-thread on the spindle and a mating thread on a part to be mounted. That type of mounting has several objections, among which may be mentioned, first, lack of rigidity when subjected to heavy strains; second, inaccuracy, because it has been demonstrated that it is impossible to put on and take off a face-plate or other similar part repeatedly, without the threads becoming worn and inaccurate; third, that if a spindle running at present-day speeds be stopped suddenly, the momentum of the part screwed to the spindle is sufficient to cause such part to unscrew from the spindle, with the possibility of causing damage to the work and to the machine, and injury to the workman; and fourth, the necessity of the exercise of great care on the part of the workman to see that the screw-threads are free from foreign matter, and properly lubricated before being screwed together. When neglect of this kind occurs, the parts become jammed, or "frozen" together, with the result that the screw-threads are damaged and in extreme cases injured beyond repair.

The object of my invention is to overcome these objections, and to provide a more simple, rigid, accurate and durable means for mounting face-plates, chucks, fixtures and other parts on the ends of spindles, or their equivalents. Although the spindle shown in the drawing is that of a lathe, my invention is not limited to that particular machine, as the invention may be employed advantageously in any situation where the results desired are similar to those which are found desirable in lathe work.

The invention will best be understood by reference to the following description, when taken in connection with the accompanying drawing of one specific embodiment thereof, while its scope will be pointed out more particularly in the appended claims.

In the drawing:

Fig. 1 is a longitudinal, sectional view of a portion of a lathe having a spindle provided with a work-supporting and rotating structure exemplifying the invention, showing a face plate in place on the spindle;

Fig. 2 is a longitudinal, sectional view of the mounting with the face-plate removed, and with a lathe dog in place; and Fig. 3 is a sectional view on line 3—3 of Fig. 2.

Referring to the drawing, and to the embodiment of the invention which is illustrated therein, there is shown a portion of a head-stock 5 of a lathe, and in this head-stock there is a front spindle bearing mounting 6, in which there is mounted an appropriate bearing, herein a roller bearing, comprising inner and outer races 7 and 8 and a set of rollers 9. A spindle 10, mounted in the inner race, is provided with a shoulder 11, which rests against the outer end of the race. A lubricant-retaining ring 12, seated within the bearing mounting, prevents the escape of lubricant from the bearing. The spindle is provided with a usual internal taper 13, to receive a taper socket 14, the latter in turn receiving a usual lathe center 15.

In accordance with my invention, the spindle is provided with an enlargement in the nature of an annular flange 16, which is received in a chamber 17 presented by a body 18, which in the present example is a face-plate, though it should be understood that a face-plate is shown only by way of example, and that the invention contemplates the mounting of other bodies, such as chucks, fixtures and similar parts. In the embodiment shown, the enlargement or flange has a peripheral tapered surface 19, which snugly fits a corresponding surface 20 within the chamber 17, and the enlargement has a face 21, which contacts with a corresponding face 22 within the chamber. Thus the body, which is mounted on the spindle, is positioned accurately on the latter concentric with its axis.

To draw the body 18 into its proper position on the spindle, I have provided appropriate means, herein a collar 23, interposed between the spindle bearing and the enlargement 16, and to bring the face-plate close to the bearing this collar is received in the chamber 17, the latter being provided with an internal screw-thread 24, to receive an external screw-thread 25 presented by the collar. This collar bears against the rear face of the enlargement 16, and when turned in the proper direction will cause the body 18 to be seated firmly and accurately thereon. The internal surface of the collar is separated from the spindle by a clearance space 26, which in practice is five-thousandths of an inch, but in the drawing is exaggerated to bring out the fact that the collar is in the nature of a floating element which has no part in centering the body 18, its sole function being to draw the body into place, and to maintain it in firm engagement with the enlargement on the spindle. Rotation of the collar is conveniently accomplished by extending the same rearwardly toward the spindle bearing a sufficient distance to enable it to be provided with a set of radial slots 27 (see Fig. 3), to receive a flat bar (not shown), by means of which the collar may be turned. While the described fastening means might, in and of itself, be sufficient to prevent the turning of the body on the spindle, in the present example, the body is provided with one or more, herein a plurality of driving pins 28, secured to the body and projecting therefrom into corresponding openings 29 provided in the enlargement 16 of the spindle.

In Fig. 2, the face plate has been removed, and the spindle has been turned through an angle of 90 degrees, to show the fact that the enlargement is provided with a pair of slots 30 to receive a tail 31 of a work-driver such as a usual dog 32, having a set screw 33, by which it is secured to a work-piece 34, the dog and work-piece being shown in dotted lines. Any conventional means for driving the work may be used equally as well. The dog shown is of small dimensions, and thus may be used without the face plate in place. The direct connection of the work-driver to the spindle affords a positive drive, as nothing can come apart. When larger dogs are employed, they are of course used in connection with the face plate in the usual manner, providing the latter with slots 35.

Having thus described one embodiment of the invention, but without limiting myself thereto, what I claim and desire by Letters Patent to secure is:—

1. In a work-rotating structure for machine tools, the combination of a spindle having an enlargement provided with one or more slots to receive the tail of a driving member or members of a work-driver, a body mounted on said enlargement, and means independent of and disposed axially inwardly with relation to said slot or slots to secure said body to said spindle, said means having screw-threaded engagement with and being rotatable with relation to said body.

2. In a work-rotating structure for machine tools, the combination of a spindle having an enlargement provided with one or more slots to receive the tail of a driving member or members of a work-driver, a body mounted on said enlargement, and means independent of and disposed axially inwardly with relation to said slot or slots to secure said body to said spindle, said means engaging the inner end of said enlargement and having screw-threaded engagement with and being rotatable with relation to said body.

3. In a work-rotating structure for machine tools, the combination of a spindle having an integral enlargement provided with one or more generally radial slots to receive the tail of a driving member or members of a work-driver, a body mounted on said enlargement, said body and said enlargement having interengaging means independent of said slot or slots to cause said enlargement to impart a positive rotation to said body, and means disposed axially inwardly with relation to said slot or slots and with relation to said interengaging means to prevent axial movement of said body with relation to said enlargement.

4. In a work-rotating structure for machine tools, the combination of a spindle having an integral enlargement provided with one or more generally radial slots to receive the tail of a driving member or members of a work-driver, a body mounted on said enlargement, said body and said enlargement having interengaging means independent of said slot or slots to cause said enlargement to impart a positive rotation to said body, and means disposed axially inwardly with relation to said slot or slots and with relation to said interengaging means to prevent axial movement of said body with relation to said enlargement, the second-mentioned means having screw-threaded engagement with said body and being rotatable with relation to said body and said enlargement.

5. In a work supporting and rotating structure for machine tools, the combination of a spindle having a tapered surface and an end face axially outwardly beyond said tapered surface, radially inwardly with relation to said tapered surface and perpendicular to the axis of rotation of said spindle, a body provided with a chamber having a tapered surface and an internal face corresponding to and engaging said tapered surface and said end face, respectively, of said spindle, interengaging driving means between said axis and said tapered surfaces and connecting said body to said spindle, and means radially outward from said tapered surfaces to urge said body axially with relation to said spindle to maintain such engagement.

6. In a work supporting and rotating structure for machine tools, the combination of a spindle provided with an enlargement, a body supported thereby, said body being provided with a chamber in which the whole of said enlargement is received, said chamber and said enlargement being provided with endwise engaging surfaces perpendicular to their axis of rotation and being provided with tapered engaging surfaces axially inwardly with relation to said endwise engaging surfaces, and means connecting said spindle and said body to maintain such engagement.

7. In a work supporting and rotating structure for machine tools, the combination of a spindle provided with an annular projection having a tapered surface and an end face radially inwardly with relation to said tapered surface and perpendicular to the axis of rotation of said spindle, said projection having one or more openings between said axis and said tapered surface, a body provided with a chamber having a tapered surface and an end face, said tapered surfaces engaging each other and said end faces engaging each other, one or more projections carried by said body between said axis and said tapered surfaces and received in said opening or openings, and means connecting said annular projection and said body to maintain such engagement.

8. In a work supporting and rotating structure for machine tools, the combination of a spindle provided with a lateral projection having an external, tapered surface and at its outer end a face perpendicular to its axis and disposed radially inwardly with relation to said tapered surface, a body provided with a chamber in which the whole of said projection is received, said chamber having an internal tapered surface and an internal face perpendicular to its axis, said tapered surfaces engaging each other and said faces engaging each other, and means connecting said spindle and said body radially outwardly beyond said tapered surfaces and radially outwardly beyond said faces to maintain such engagement.

9. In a work supporting and rotating structure for machine tools, the combination of a spindle provided with an enlargement, a body provided with a chamber which receives said enlargement, said enlargement and said chamber having engaging annular surfaces and having endwise engaging faces perpendicular to the axis of rotation axially outwardly beyond said annular surfaces, said enlargement and said body having positively interengaged driving means disposed radially inwardly with relation to said annular surfaces, said body being provided with an internal screw-thread, and a collar rotatable on and about said spindle and having an external screw-thread which engages said internal screw-thread.

10. In a work supporting and rotating structure for machine tools, the combination of a spindle provided with an enlargement having an annular surface and a flat end face perpendicular to the axis of rotation axially outwardly beyond said annular surface, a body provided with a chamber which receives said enlargement and has an annular surface and a flat face corresponding to and engaging said surfaces of said enlargement, said enlargement and said body having positively interengaged driving means, and means within said chamber rotatable with relation to said spindle to secure said body to said spindle.

11. In a work supporting and rotating structure for machine tools, the combination of a spindle provided with an enlargement having an annular surface and a flat end face perpendicular to the axis of rotation axially outwardly beyond said annular surface, a body provided with a chamber which receives said enlargement and has an annular surface and a flat face corresponding to and engaging said surfaces of said enlargement, said enlargement and said body having positively interengaged driving means, and means comprising a threaded collar rotatable relatively to said spindle to secure said body to said spindle and having one or more openings to receive a tool by which it may be rotated.

12. In a work-supporting and rotating structure for machine tools, the combination of a spindle provided at its outer end with an integral enlargement having a tapered surface and an end face axially outwardly beyond said tapered surface and radially inwardly with relation to said tapered surface, said enlargement being provided with an opening extending axially inwardly from said end face and disposed radially inwardly with relation to said tapered surface, and a body provided with a chamber having a tapered surface and an end face engaging said tapered surface and said end face, respectively, of said enlargement.

13. In a work-supporting and rotating structure for machine tools, the combination of a spindle provided at its outer end with an integral enlargement having a tapered surface and an end face axially outwardly beyond said tapered surface and radially inwardly with relation to said tapered surface, said enlargement being provided with a generally radial slot extending axially inwardly from said end face and disposed at least in part radially inwardly with relation to said tapered surface, and a body provided with a chamber having a tapered surface and an end face engaging said tapered surface and said end face, respectively, of said enlargement.

14. In a work-supporting and rotating structure for machine tools, the combination of a spindle provided at its outer end with an integral enlargement having a tapered surface and an end face axially outwardly beyond said tapered surface and radially inwardly with relation to said tapered surface, said enlargement being provided with an opening extending axially inwardly from said end face and disposed radially inwardly with relation to said tapered surface, said enlargement being provided also with a generally radial slot extending axially inwardly from said end face and disposed at least in part radially inwardly with relation to said tapered surface, and a body provided with a chamber having a tapered surface and an end face engaging said tapered surface and said end face, respectively, of said enlargement.

15. In a work-supporting and rotating structure for machine tools, the combination of a spindle provided with an annular projection having a tapered surface and an end face perpendicular to the axis of rotation of said spindle, said projection being provided with a generally radial slot extending axially inwardly from said end face and disposed at least in part radially inwardly with relation to said tapered surface, a body provided with a chamber having a tapered surface and an end face, said tapered surfaces engaging each other and said end faces engaging each other, and means connecting said annular projection and said body to maintain such engagement.

16. In a work-supporting and rotating structure for machine tools, the combination of a spindle provided at its outer end with an enlargement having a tapered, circumferential surface and a flat, end face axially outwardly beyond and radially inwardly with relation to said tapered, circumferential surface, a body provided with a chamber which receives said enlargement and has a tapered, circumferential surface and a flat face corresponding to and engaging said surfaces of said enlargement, and means to prevent axial movement of said body with relation to said enlargement.

17. In a work-supporting and rotating structure for machine tools, the combination of a spindle provided at its outer end with an enlargement having a tapered, circumferential surface and a flat, end face axially outwardly beyond and radially inwardly with relation to said tapered, circumferential surface, a body provided with a chamber which receives said enlargement and has a tapered, circumferential surface and a flat face corresponding to and engaging said surfaces of said enlargement, and means to prevent axial movement of said body with relation to said enlargement, said means being disposed axially inwardly with relation to and engaging the inner face of said enlargement.

HERBERT L. FLATHER.